United States Patent Office 3,250,712
Patented May 10, 1966

3,250,712
SULFUR-CONTAINING PHENOLIC COMPOUNDS
Thomas H. Coffield, Farmington, Mich., assignor to Ethyl Corporation, New York, N.Y., a corporation of Virginia
No Drawing. Original application July 24, 1959, Ser. No. 829,232. Divided and this application July 23, 1962, Ser. No. 211,829
The portion of the term of the patent subsequent to Oct. 22, 1979, has been disclaimed
6 Claims. (Cl. 252—48.2)

This application is a division of application Serial No. 829,232, filed July 24, 1959, and now abandoned, which in turn is a continuation-in-part of applications Serial No. 720,825, filed March 12, 1958, and now U.S. Patent No. 3,057,926 and Serial No. 779,068, filed December 9, 1958, and now U.S. Patent No. 3,069,384.

This invention deals with a novel class of organic compounds which are eminently suited to the protection of synthetic hydrocarbon polymers and other organic material from oxidative deterioration.

It is an object of this invention to provide a novel class of phenolic compounds. A further object is to provide a special class of phenolic sulfur compounds which have outstanding antioxidant properties when used in small amounts in certain synthetic hydrocarbon polymers and other organic material. A further object is to provide as a new composition of matter, synthetic hydrocarbon polymers which are stabilized by the phenolic sulfur compounds herein disclosed. A specific object of this invention is to provide polyethylene which possesses outstanding oxidative stability.

The objects of this invention are accomplished by providing a compound having the formula:

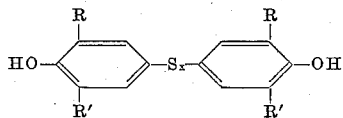

wherein R is an alkyl group branched on the alpha carbon atom and having from 3 to 4 carbon atoms inclusive and R' is a member of the class consisting of alkoxy groups having from 1 to 4 carbon atoms and alkyl groups branched on the alpha carbon atoms having from 3 to 4 carbon atoms, and $x$ is an integer from 2 to 3 inclusive.

These compounds are extremely effective antioxidants in a very wide range of organic material. They are superior to closely related compounds having different configurations of substituents on the phenolic nucleus. They are unexpectedly more effective than these related compounds and those which contain only a single sulfur atom between the phenolic nuclei. In addition, the compounds of this invention do not have the inherent disadvantages of other known antioxidants. Thus, the compounds of this invention do not corrode metal surfaces nor cause undesirable color in the substrate which they protect against oxidation. Furthermore, the compounds of this invention are effective antioxidants under service conditions in which other antioxidants are prone to become ineffective.

The compounds of this invention include: 4,4'-dithiobis(2,6-di-tert-butylphenol), 4,4'-trithiobis-(2-methoxy-6-isopropylphenol), 4,4'-dithiobis-(2-isopropyl-6-sec-butylphenol), 4,4'-dithiobis - (2,6-diisopropylphenol), 4,4'-dithiobis-(2-ethoxy-6-tert-butylphenol), 4,4' - trithiobis - (2-methoxy-6-sec-butylphenol), 4,4'-dithiobis-(2-n-propoxy-6-tert-butylphenol), 4,4'-trithiobis-(2-sec - butyl-6-tert-butylphenol), and the like.

The alkyl radical represented by R in the above formula includes the isopropyl group, the tert-butyl group and the secondary butyl group. The novel compounds containing these groups are readily prepared and are extremely effective antioxidants as will be described in more detail below. Those compounds in which R is a tert-butyl or isopropyl group are preferred as it is found that they are outstanding antioxidants.

The alkoxy groups which may constitute the group R' in the above formulas are those lower alkoxy groups having from 1 to 4 carbon atoms and thus include the methoxy, ethoxy, propoxy, isopropoxy, butoxy, sec-butoxy, tert-butoxy and isobutoxy. Of these the methoxy group is preferred as compounds containing this group are found to be more easily prepared.

The compounds of this invention have been found to be outstanding antioxidants. Thus, an embodiment of this invention is a new composition of matter which comprises organic material normally tending to undergo oxidative deterioration in the presence of air, oxygen or ozone, containing a small antioxidant quantity, up to 5 percent, of a compound having the formula:

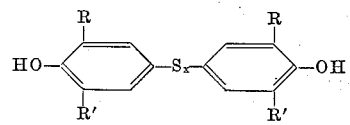

wherein R is an alkyl group branched on the alpha carbon atom having from 3 to 4 carbon atoms inclusive, R' is selected from alkoxy groups of 1 to 4 carbon atoms and alkyl groups branched on the alpha carbon atom having from 3 to 4 carbon atoms, and $x$ is an integer from 2 to 3. The quantity of antioxidant employed will vary from a small quantity, such as 0.001 percent by weight to a larger amount—from 3 to 5 percent, depending on the inherent stability of the material to be protected.

The compounds of this invention find important utility as antioxidants in a wide variety of oxygen sensitive materials. Thus, liquid hydrocarbon fuels such as gasoline, kerosene and fuel oil are found to possess greatly increased storage stability by the use of an antioxidant of this invention. Likewise, liquid hydrocarbon fuels such as gasoline which contain organometallic additives such as tetraethyllead, as well as other organometallic compounds which are used as fuel additives, attain appreciably increased oxidative stability by the practice of this invention. In addition, lubricating oils and functional fluids, both those derived from naturally occurring hydrocarbons and those synthetically prepared, are greatly enhanced by the practice of this invention. The addition of small quantities of the compounds of this invention to such materials as turbine, hydraulic, transformer and other highly refined industrial oils; waxes; soaps and greases; plastics; organometallic compositions such as tetraethyllead and tetraethyllead antiknock fluids; elastomers, including natural rubber; crankcase lubricating oils; lubricating greases; and the like, greatly increase their resistance to deterioration in the presence of air, oxygen or ozone.

The compounds of this invention are also very effective antioxidants for high molecular weight unsaturated hydrocarbon polymers, such as polybutadiene, methyl rubber, polybutene rubber, natural rubber, butyl rubber, GR–S rubber, GR–N rubber, piperylene rubber, dimethyl butadiene rubber and the like.

The compounds of this invention are also useful in protecting petroleum wax—paraffin wax and micro-crystalline wax—against oxidative deterioration. The compounds of this invention also find use in the stabilization of edible fats and oils of animal or vegetable origin which tend to become rancid especially during long periods of storage because of oxidative deterioration. Typical representatives of these edible fats and oils are linseed oil, cod liver oil, castor oil, soybean oil, rapeseed oil, coconut oil, olive oil, palm oil, corn oil, sesame oil, peanut oil, babassu oil, butter, fat, lard, beef tallow, and the like.

An important embodiment of the present invention is rubber containing as an antioxidant therefor, a 4,4'-polythiobis (substituted phenol) as defined above. The stabilizer is incorporated into the rubber by milling, Banbury mixing, or similar process, or is emulsified and the emulsions added to the rubber latex before coagulation. In the various embodiments of this invention the stabilizer is used in small amounts, generally ranging from about 0.001 to about 5.0 percent.

As used in the description and claims, the term "rubber" is employed in a generic sense to define a high molecular weight plastic material which possesses high extensibility under load coupled with the property of forcibly retracting to approximately its original size and shape after the load is removed. It is preferable that the rubber be a sulfur-vulcanizable rubber, such as India rubber, reclaimed rubber, balata, gutta-percha, rubbery conjugated diene polymers and copolymers exemplified by the butadiene-styrene (GR–S) and butadiene-acrylonitrile (GR–N or Paracril) rubbers and the like, although the invention is applicable to the stabilization of any rubbery, high molecular weight organic material which is normally susceptible to deterioration in the presence of oxygen, air, or ozone. The nature of these rubbers is well known to those skilled in the art.

Among the definite advantages provided by this invention is that the present rubber compositions possess unusually great resistance against oxidative deterioration. Moreover, these compositions exhibit excellent non-staining and non-discoloration characteristics. Furthermore, the novel thiobisphenol stabilizer is relatively inexpensive and easily prepared, and possesses the highly beneficial property of low volatility. As is well known, a highly desirable feature of a rubber antioxidant is that it have a low volatility so that it remains admixed with the rubber during vulcanization and related process steps.

The present invention will be still further apparent from the following specific examples wherein all parts and percentages are by weight.

*Example 1*

To a synthetic rubber master batch comprising 100 parts of SB–R rubber having an average molecular weight of 60,000, 50 parts of mixed zinc propionate-stearate, 50 parts of carbon black, 5 parts of road tar, 2 parts of sulfur and 1.5 parts of mercapto-benzothiazole is incorporated 1.5 parts of 4,4'-dithiobis-(2,6-di-tert-butylphenol). This batch is then cured for 60 minutes at 45 p.s.i. of steam pressure.

*Example 2*

Two parts of 4,4'-trithiobis-(2,6-di-tert-butylphenol) is incorporated in 100 parts of raw butyl rubber prepared by the copolymerization of 90 percent of isobutylene and 10 percent of isoprene.

*Example 3*

To 200 parts of raw butyl rubber prepared by copolymerization of 95 percent of isobutylene and 5 percent of butadiene is added 1.5 parts of 4,4'-trithiobis-(2,6-diisopropylphenol).

*Example 4*

To a master batch of GR–N synthetic rubber comprising 100 parts of GR–N rubber, 5 percent of zinc stearate, 50 parts of carbon black, 5 parts of road tar, 2 parts of sulfur and 2 parts of mercaptobenzothiazole is added 5 percent based on the weight of the batch of 4,4'-dithiobis-(2-tert-butyl-6-isopropylphenol).

*Example 5*

To a natural rubber (Hevea) is added 0.1 percent of 4,4'-trithiobis-(2-ethoxy-6-sec-butylphenol).

*Example 6*

A butadiene-acrylonitrile copolymer is produced from butadiene-1,3 and 32 percent of acrylonitrile. Two percent (based on the dry weight of the copolymer) of 4,4'-dithiobis-(2,6-di-tert-butylphenol) is added as an emulsion in sodium oleate solution to the latex obtained from emulsion copolymerization of the monomers. The latex is coagulated with a pure grade of aluminum sulfate and the coagulum, after washing, is dried for 20 hours at 70° C.

*Example 7*

Three percent of 4,4'-trithiobis-(2,6-diisopropylphenol) emulsified in sodium oleate is added to a rubber-like, copolymer of butadiene-1,3 and styrene containing 25 percent of combined styrene.

*Example 8*

A rubber stock is compounded from 100 parts of smoked sheet rubber, 60 parts of zinc oxide, 20 parts of lithopone, 2 parts of sulfur, 0.7 part of diphenyl guanidine phthalate, 0.8 parts of benzoyl thiobenzothiazole, 0.2 part of paraffin and 2 parts of 4,4'-dithiobis-(2-isopropyl-6-sec-butylphenol). The stock so compounded is cured by heating for 45 minutes at 126° C. in a press.

Each of the above illustrated rubber compositions of this invention possesses greatly improved resistance against oxidative deterioration as compared with the corresponding rubber compositions which are devoid of an antioxidant. Moreover, the light-colored stocks of the above examples exhibit virtually no discoloration or staining characteristics even when subjected to severe weathering conditions and the like. The methods of formulating the improved rubber compositions of this invention will now be clearly apparent to those skilled in the art.

To illustrate the enhanced oxygen resistance of the rubber compositions of this invention and their excellent non-staining and non-discoloration characteristics, a light-colored stock is selected for test. This stock had the following composition:

| | Parts by weight |
|---|---|
| Pale crepe rubber | 100.00 |
| Zinc oxide filler | 50.00 |
| Titanium dioxide | 25.00 |
| Stearic acid | 2.00 |
| Ultramarine blue | 0.12 |
| Sulfur | 3.00 |
| Mercaptobenzothiazole | 1.00 |
| | 181.12 |

To the above base formula is added one part by weight of 4,4'-dithiobis-(2,6-di-tert-butylphenol), and individual samples are cured for 20, 30, 45 and 60 minutes at 274° C. using perfectly clean molds with no mold lubricant. Another set of samples of the same base formula which do not contain an antioxidant are cured under the same conditions.

To demonstrate the protection afforded to the rubber by the practice of this invention, weighed samples, with and without inhibitor, are subjected to accelerated aging. The aging is accomplished by conducting the procedure of ASTM Designation: D–572–52, described in the ASTM Standards for 1952, Part 6, for a period of 168 hours at a temperature of 70° C. with an initial oxygen pressure in the test bomb of 300 p.s.i.g.

Measurements are made of the increase in weight of the test specimens which occurs during the accelerated aging. This is a direct measure of the oxygen up-take of the samples and provides another criterion of the effectiveness of an inhibitor in suppressing oxidative deterioration of the rubber. Thus, the larger the weight increase, the greater is the deterioration and the less effective is the inhibitor.

In all the above tests, the composition compounded with 4,4'-dithiobis-(2,6-di-tert-butylphenol) gives results which show this additive to be an excellent antioxidant.

The amount of stabilizer employed in the rubber compositions of this invention varies from about 0.01 to about 5 percent by weight based on the weight of the rubber. The amount used depends somewhat upon the nature of the rubber being protected and the conditions of service to be encountered. Thus, in the stabilization of natural and synthetic rubber to be used in the manufacture of tires which are normally subjected to exposure to the elements, as well as to the action of sunlight, frictional heat, stress, and the like, the use of relatively high concentrations of this inhibitor is advantageous. On the other hand, when the article of manufacture is not to be subjected to such severe conditions, relatively low concentrations can be successfully utilized. Generally speaking, amounts ranging from about 0.1 to about 3 percent by weight give uniformly satisfactory results.

Other rubbers and elastomers which can be preserved according to this invention are the rubbery polymerizates of isoprene, butadiene-1,3, piperylene; also the rubbery copolymer of conjugated dienes with one or more polymerizable monoolefinic compounds which have the capability of forming rubber copolymers with butadiene-1,3, outstanding examples of such monoolefinic compounds being those having the group $CH_2=C$, exemplified by styrene. Examples of such monoolefins are styrene, vinyl naphthalene, alpha methyl styrene, para-chlorostyrene, dichlorostyrene, acrylic acid, methyl acrylate, methyl methacrylate, methacrylonitrile, methacrylamine, methyl vinyl ether, methyl vinyl ketone, vinylidene chloride, vinyl carbazole, vinyl pyridines, alkyl-substituted vinyl pyridines, etc. In fact, excellent stabilization is achieved by incorporating a compound of this invention in any of the well-known elastomers which are normally susceptible to deterioration in the presence of air, such as elastoprenes, elastolenes, elastothiomers, and elastoplastics.

The novel compounds of this invention are also effective antioxidant additives for saturated hydrocarbon synthetic polymers. Thus, an embodiment of this invention is a novel composition of matter comprising a saturated hydrocarbon synthetic polymer derived from polymerization of an aliphatic monoolefin hydrocarbon compound having up to 5 carbon atoms and a small antioxidant quantity, up to 5 percent, of a compound of this invention.

The saturated hydrocarbon synthetic polymer which is greatly enhanced by oxidative stability by the practice of this invention, includes polymers obtained from the polymerization of a hydrocarbon monoolefin having up to 5 carbon atoms. Examples of such monomers include ethylene, propylene, butylene and isobutylene. Thus, the polymers are homopolymers and copolymers of ethylene, propylene, butylene, isobutylene and the various pentenes.

A particularly preferred embodiment of this invention is polyethylene containing a small antioxidant quantity up to about 5 percent of 4,4'-trithiobis-(2,6-di-tert-butylphenol).

Polyethylene is a hydrocarbon polymer derived from the polymerization of ethylene. This polymerization can be accomplished by a great variety of methods which lead to products of diverse properties. Polyethylene of any nature may advantageously be utilized for preparing compositions according to the present invention. The polymers of ethylene which are employed may, for example, be similar to those which may be obtained by polymerizing ethylene in a basic aqueous medium and in the presence of polymerization favoring quantities of oxygen under relatively high pressures in excess of 500 or 1,000 atmospheres at temperatures between 150 and 275° C. Or, if desired, they may be similar to the essentially linear and unbranched polymers ordinarily having greater molecular weights which may be obtained under relatively low pressures of 1 to 100 atmospheres using such catalysts to polymerize the ethylene as mixtures of strong reducing agents and compounds of group IVB, VB and VIB metals of the Period System; chromium oxide on silicated alumina; hexavalent molybdenum compounds; and charcoal supported nickel-cobalt. The polyethylene which results from these various polymerization processes may have a molecular weight in the range from 1300 to over 1,000,000 depending on the particular conditions of polymerization employed.

There are several methods available for preparing the inhibited hydrocarbon polymer compositions of this invention. Thus, the blending of the antioxidant of this invention with a polymer such as, for example, polyethylene, may be carried out on open rolls, on internal mixers or may be accomplished by mixing with extrusion. It is also possible to prepare concentrated batches of the polymer containing excessive amounts of the additive and then mix the concentrate with additional polymer to prepare a composition of this invention. The preferred method of compounding the polymers is by milling on heated open rolls at slightly elevated temperatures by methods well-known to the art. The temperature range employed is sometimes critical as certain polyethylenes will not melt at low temperatures and tend to stick to the rolls at high temperatures. The antioxidant may be initially mixed with the polymer in the dried state or it may be first dissolved in a suitable solvent, then sprayed on the polymer and milled in.

The benefits derived from the practice of this invention are demonstrated by comparative oxidation tests of uninhibited polyethylene and polyethylene containing an antioxidant of this invention. These tests are conducted as follows: The selected amount of antioxidant is blended with the polyethylene by milling a weighed quantity of plastic pellets on a warm roll-mill. The weighed quantity of antioxidant is added to the mill after the polyethylene has been pre-milled for a short period of time. The plastic containing the antioxidant is then added in weighed quantity to a standard size vessel and melted to give a surface of reproducible size. The vessel is then inserted into a chamber which may be sealed and which is connected to a capillary tube leading to a gas buret and leveling bulb. The apparatus is flushed with oxygen at room temperature, sealed, and the temperature is raised to 150° C. The oxygen pressure is maintained at one atmosphere by means of a leveling bulb. The oxygen uptake at the elevated temperature is recorded until sharp increase in the oxygen uptake occurs. This procedure has been adopted since it has been found that many compounds may inhibit the oxidation for a certain induction period after which time a very sharp increase in the rate of oxygen uptake occurs. This increase indicates that the antioxidant has been exhausted. In tests of this nature it is found that the compounds of this invention greatly increase the "induction period" of the polyethylene.

Example of the hydrocarbon polymer compositions of this invention prepared as described above follow. All parts and percentages are by weight in these examples.

*Example 9*

To 1,000 parts of a solid polypropylene polymer having a density of 0.905 and a Rockwell hardness greater than 85 and which is isotactic is added and blended to 5 parts of 4,4'-trithiobis-(2-,6-di-tert-butylphenol).

*Example 10*

To an isotactic polypropylene having a tensile strength greater than 4300 p.s.i. and a compressive strength of about 9,000 p.s.i. is added sufficient 4,4'-dithiobis-(2,6- di-tert-butylphenol) to give a composition containing 0.5 percent of the compound.

*Example 11*

To a wax-like polypropylene having a melting point above 130° C. and a molecular weight of about 4,000, a density of 0.913 is added 0.01 percent of 4,4'-trithiobis-(2-methoxy-6-isopropylphenol).

The antioxidant is added to the polypropylene in the molten state and the mixture is allowed to solidify into the desired shape. A polypropylene product of outstanding oxidative stability results.

*Example 12*

To 1,000 parts of polyethylene produced by oxygen catalyzed reaction under a pressure of 20,000 atmospheres and having an average molecular weight of 40,000 is added and mixed 2 parts of 4,4'-dithiobis-2-ethoxy-6-isopropylphenol).

*Example 13*

To 100 parts of polyisobutylene having an average molecular weight of 100,000 is added 0.5 part of 4,4'-trithiobis-2-iso-propyl-6-tert-butylphenol).

*Example 14*

To a master batch of high molecular weight polyethylene having an average molecular weight of about 1,000,000, a tensile strength of 6,700 p.s.i., a Shore D hardness of 74 and a softening temperature under low load of 150° C. is added 5 percent of 4,4'-dithiobis-(2,6-di-sec-butylphenol).

*Example 15*

A linear polyethylene having a high degree of crystallinity up to 93 percent and below one ethyl branched chain hundred carbon atoms, a density of about 0.96 gram per milliliter and which has about 1.5 double bonds per 100 carbon atoms is treated with $50 \times 10^{-6}$ roentgens of $\beta$-radiation. To the thus irradiated polymer is added 0.005 percent of 4,4'-trithiobis-(2,6-di-tert-butylphenol).

*Example 16*

To a polyethylene having an average molecular weight of 1500, a melting point of 88–90° C. and a specific gravity of 0.92 is added 1 percent of 4,4'-dithiobis-(2,6-di-tert-butylphenol). After milling in the antioxidant an extremely oxidation resistant product results.

*Example 17*

Two parts of 4,4'-trithiobis-(2,6-diisopropylphenol) are added with milling to 100 parts of a low density polyethylene prepared by high pressure polymerization and which has an average molecular weight of 18,000 to 20,000. The resulting product is vastly improved in its oxidative stability.

*Example 18*

To 10,000 parts of a polyethylene having an average molecular weight of about 100,000 and which has a tensile strength of 5400 p.s.i., a Shore D hardness of 70 and a softening temperature of 130° C. under low load is added 10 parts of 4,4'-trithiobis-(2,6-di-tert-butylphenol), to prepare a composition of outstanding oxidative stability.

*Example 19*

To the polyethylene in Example 15 is added 0.05 percent of 4,4'-dithiobis-(2,6-di-tert-butylphenol). The resulting composition has improved antioxidant characteristics.

*Example 20*

To a polyisobutylene polymer having an average molecular weight of 35,000 is added sufficient 4,4'-dithiobis-(2-tert-butoxy-6-tert-butylphenol) to give a composition containing 0.03 percent of the antioxidant. The composition has improved antioxidant properties due to the presence of the additive.

In addition to the antioxidant of this invention the saturated hydrocarbon polymers may contain other compounding and coloring additives including minor proportions of carbon black, elastomers, polyvinyl compounds, carboxylic acid esters, unrealdehyde condensation products, flame retarding agents such as antimony trioxide and chlorinated hydrocarbons and various pigment compositions designed to impart color to the finished product.

In general, the amount of antioxidant employed in the hydrocarbon polymers of this invention varies from about 0.001 percent to about 2 percent or more. Most polymers are adequately protected with concentrations ranging from 0.01 to about 1 percent.

The following examples illustrate various other embodiments of this invention. The physical characteristics of the illustrative oils used in Examples 21–26 are shown in Table I.

TABLE I.—PROPERTIES OF REPRESENTATIVE PETROLEUM HYDROCARBON OILS

| Oil | A | B | C | D | E | F |
|---|---|---|---|---|---|---|
| Gravity at 60° API | 30.3 | 30.5 | 28.8 | 31.1 | 20.5 | 31.0 |
| Viscosity, Saybolt: | | | | | | |
| Seconds at 100° F | 178.8 | 373.8 | 309.8 | 169.0 | 249.4 | 335.4 |
| Seconds at 210° F | 52.0 | 58.4 | 63.8 | 51.5 | 45.7 | 68.4 |
| Viscosity Index | 154.2 | 107.4 | 141.9 | 157.8 | 35.8 | 144.4 |
| Pour Point | −30 | +10 | −20 | −15 | | 0 |
| Flash Point | 410 | 465 | | | 365 | 385 |
| Sulfur, Percent | 0.2 | 0.3 | 0.3 | 0.3 | 0.3 | 0.1 |

*Example 21*

To 100,000 parts of Oil A is added with stirring 12 parts (0.012 percent) of 4,4'-dithiobis-(2,6-di-tert-butylphenol). The resulting oil is found to possess improved resistance to oxidative deterioration.

*Example 22*

To 100,000 parts of Oil B is added 2,000 parts (2 percent) of 4,4'-trithiobis-(2-methoxy-6-tert-butylphenol). On agitating this mixture, a homogeneous solution results and the resulting oil composition possesses enhanced oxidation resistance.

*Example 23*

With 100,000 parts of Oil C is blended 50 parts (0.05 percent) of 4,4'-trithiobis-(2,6-di-tert-butylphenol). The resulting oil possesses enhanced resistance against oxidative deterioration.

*Example 24*

To 100,000 parts of Oil D is added 100 parts (0.1 percent) of 4,4'-dithiobis-(2-tert-butoxy-6-tert-butylphenol). The resulting oil is found to possess enhanced resistance against oxidative deterioration.

*Example 25*

With 100,000 parts of Oil E is blended 5 parts (0.005 percent) of 4,4'-trithiobis-(2-isopropoxy-6-tert-butylphenol). After mixing the resulting oil possesses enhanced resistance to oxidation.

*Example 26*

To 100,000 parts of Oil F is added 150 parts (0.15 percent) of 4,4'-dithiobis-(2,6-di-tert-butylphenol). The resulting oil possesses enhanced resistance against oxidative deterioration.

*Example 27*

With 100,000 parts of di-(sec-amyl) sebacate having a viscosity at 210° F. of 33.8 Saybolt Universal seconds (SUS), a viscosity index of 133 and a molecular weight of 342.5 is blended 100 parts (0.1 percent) of 4,4'-trithiobis-(2-ethoxy-6-sec-butylphenol). The resulting diester lubricant possesses greatly enhanced resistance against oxidative deterioration.

Example 28

To 100,000 parts of di-(2-ethylhexyl) sebacate having a viscosity at 210° F. of 37.3 SUS, a viscosity index of 152 and a molecular weight of 426.7 is added 1,000 parts (1 percent) of 4,4'-dithiobis-(2,6-diisopropylphenol). After mixing, the resultant diester lubricant possesses greatly enhanced oxidation resistance.

Example 29

To 100,000 parts of di-(2-ethylhexyl) adipate having a viscosity at 210° F. of 34.2 SUS, a viscosity index of 121 and a molecular weight of 370.6 is added 2,000 parts (2 percent) of 4,4'-trithiobis-(2,6-di-tert-butylphenol). After mixing, the resultant diester lubricant possesses outstanding resistance against oxidative deterioration.

Most lubricant compositions are adequately protected by the inclusion of from 0.01 to about 2 percent of an antioxidant of this invention. However, in some cases, it is desirable to add amounts outside this range.

The compounds of this invention effectively stabilize such lubricating and industrial oils as crankcase lubricating oils, transformer oils, turbine oils, transmission fluids, cutting oils, gear oils, industrial oils, mineral white oils, glass annealing oils, oils thickened with soaps and inorganic thickening agents (grease), and, in general, engine and industrial oils which are derived from crude petroleum and are normally susceptible to deterioration in the presence of air, particularly at elevated temperatures and most particularly in the presence of iron oxide. Furthermore, the novel compounds of this invention very effectively enhance the oxidation resistance of such diester oils as diethyl oxalate; di-sec-butyl malonate; di-(2-hexyl) succinate; di-(isoheptyl) pimelate; di-(3-decyl) suberate; di-sec-amyl glutarate; di-(isobutyl) glutarate; di-2-ethylbutyl glutarate; di-(2-ethylhexyl) glutarate; di-sec-amyl adipate; di-(3-methylbutyl) adipate; diethyl adipate; di-2-ethylhexyl adipate; di-sec-amyl azelate; di-(isobutyl) azelate; di-(2-ethylbutyl) azelate; di-(2-ethylhexyl) azelate; di-sec-amyl sebacate; di-sec-butyl sebacate; di-(2-ethylhexyl) sebacate; the glutarates, adipates, azelates and sebacates of branched chain secondary alcohols, such as undecanol, tetradecanol, etc., and, in general, diesters of the type described in the literature as useful for synthetic lubricant purposes.

In the lubricant compositions of this invention effective use can be made of other additives which are known to the art, such as other inhibitors, detergent-dispersants, pour point depressants, viscosity index improvers, antifoam agents, rust inhibitors oiliness or film strength agents, dyes and the like. Of the inhibitors which can be effectively used in combination with our inhibitors are sulfurized sperm oil, sulfurized terpenes, sulfurized paraffin wax olefins, aromatic sulfides, alkyl phenol sulfides, lecithin, neutralized dithiophosphates, phosphorous pentasulfide-terpene reaction products, diphenylamine, phenylnaphthyl amine, β-naphthol, pyrogallol, and the like. Typical of the detergent additives that can be used in the compositions of this invention are metallic soaps of high molecular weight acids, such as aluminum naphthenates, calcium phenyl stearates, calcium alkyl salicylates, alkaline earth metal petroleum sulfonates, alkaline earth metal alkyl phenol sulfides (barium amyl phenol sulfide, calcium octyl phenol disulfide, etc.), metal salts of wax-substituted phenol deratives, and the like. Of the viscosity index improvers and pour point depressants, effective use can be made of polymers of the esters of methacrylic acids, highly fatty alcohols and the corresponding polymers of esters of acrylic acid and higher fatty alcohols. These and other additives which can be employed in the compositions of this invention will now be well known to those skilled in the art.

Example 30

To 1,000 parts of gasoline having 44.0 percent paraffins, 17.9 percent olefins and 38.1 percent aromatics, an initial evaporation temperature of 94° F. and a final evaporation temperature of 119° F. is added 10 parts of 4,4'-trithiobis-(2,6-di-tert-butylphenol). The mixture is agitated to dissolve the compound. The resulting fuel has an excellent stability to oxidative deterioration.

Example 31

To 1,000 parts of commercially available diesel fuel having an octane number of 51.7 and 50 percent evaporation temperature of 509° F. is added 3 parts of 4,4'-dithiobis-(2,6-di-tert-butylphenol). The resulting fuel is stable to oxidative deterioration.

Example 32

To an antiknock fluid composition which is to be used as an additive to gasoline and which contains 61.5 parts of tetraethyllead, 17.9 parts of ethylene and 18.8 parts of ethylene dichloride is added, with agitation, 1.3 parts of 4,4'-trithiobis-(2-isopropyl-6-tert butylphenol). The resulting composition is stable for long periods when exposed to air.

Example 33

With 1,000 parts of melted lard is mixed one part (0.1 percent) of 4,4'-dithiobis-(2,6-di-tert-butylphenol). After cooling, the lard can be stored for long periods of time without the development of rancidity.

Example 34

To 5,000 parts of olive oil is added one part of 4,4'-trithiobis-(2,6-di-tert-butylphenol) and the mixture is agitated to produce a homogeneous blend which is stable to oxidative deterioration for a long period.

Example 35

4,4'-dithiobis-(2,6-di-tert-butylphenol) was dissolved in pure white refined mineral oil to the extent that $1.0 \times 10^{-2}$ moles per liter of the phenol was present in the mineral oil. Ferric hexoate was also added to the mineral oil. The concentration of the iron salt was adjusted to 0.05 percent based on $Fe_2O_3$. One milliliter of the resulting composition was charged to an apparatus for measuring the oxidative stability of the mineral oil. The apparatus consists of a glass vessel having a 12 milliliter capacity and an inlet tube which can be connected to a mercury manometer. The vessel is flushed with oxygen at atmospheric pressure and then connected to the mercury manometer. It is then immersed in a constant temperature bath at 150° C. whereupon the oxygen pressure rise is indicated on the manometer. The manometer is observed until a rapid pressure drop in the vessel occurs. The time from immersion to initiation of the pressure drop is referred to as the induction period of the mineral oil. When mineral oil containing the iron hexoate is subjected to this oxidative test, a pressure drop in the manometer is observed in from 2 to 3 minutes, showing that the mineral oil is unstable to oxidative deterioration at 150° C. However, when the composition containing $1.0 \times 10^{-2}$ moles per liter of 4,4'-dithiobis-(2,6-di-tert-butylphenol) is tested in this fashion, no pressure drop is observed in the manometer until after 125 minutes. Thus, the mineral oil has been improved by a factor of about 50 against oxidative deterioration by the presence of this small amount of 4,4'-dithiobis-(2,6-di-tert-butylphenol).

Example 36

The procedure of the above example is followed employing $1.0 \times 10^{-2}$ moles per liter of 4,4'-trithiobis-(2,6-di-tert-butylphenol). In this instance there was no pressure drop in the manometer until after 216 minutes, indicating that the oil was improved by a factor of about 100 against oxidation.

The compounds of this invention may be prepared by a process which consists of reacting the parent phenolic compound (for example, 2,6-di-tert-butylphenol) with a sulfur chloride. Either sulfur monochloride, $S_2Cl_2$, or sulfur dichloride, $SCl_2$, may be used.

The temperatures employed in this process vary over a wide range. However, low reaction temperatures reduce the yield of compounds of this invention in favor of the monothiobis compounds. On the other hand, excessively high reaction temperatures cause disassociation of sulfur dichloride and lead to excessive chlorination of the starting phenol. In general, temperatures from about 15 to 70° may be employed with best results being obtained from about 25 to about 50°.

It is convenient to conduct the preparation in suitable solvent. The solvents applicable are now boiling hydrocarbons, halogenated hydrocarbons and inert aromatic compounds such as nitrobenzene. Examples of suitable solvents include carbon tetrachloride, chloroform, N-hexane, 2,4-dibromopentane, low boiling petroleum ether and the like.

Another method which may be employed consists of first reacting the starting phenol with sulfur monochloride or sulfur dichloride at low temperatures between 5 and 35° C. and then treating the reaction product with elemental sulfur at elevated temperatures. In this manner, both the 4,4'-dithiobis and 4,4'-trithiobis phenols may be prepared.

The following examples, in which all parts are by weight, are illustrative of the methods for preparing the compounds of this invention.

Example 37

A solution of 206 parts of 2,6-di-tert-butylphenol in about 300 parts of ethylene dichloride is stirred at 15 to 20° under a nitrogen blanket. 62 parts of sulfur dichloride in about 100 parts of ethylene dichloride is slowly added. After addition of the sulfur dichloride, the reaction mixture is warmed to and maintained at 25° C. for about 6 hours and then after prolonged standing, to 35° for a short period of time. The reaction is complete at 35° C. as evidenced by the fact that warming to 40° causes no further evolution of hydrogen chloride. The reaction mixture is cooled and filtered and the residue washed with ethylene dichloride. The filtrate and ethylene dichloride wash are combined and washed with water, then washed with dilute sodium bicarbonate followed by a second water wash. The ethylene dichloride solution is then dried and stripped of the solvent at reduced pressure to give an excellent yield of 4,4'-dithiobis-(2,6-di-tert-butylphenol). This compound melts at 144-147° C. and analyzes for the calculated sulfur content, 13.5 percent.

Example 38

A solution of 227 parts of distilled $SCl_2$ and about 240 parts of petroleum ether (boiling point 36.5-38° C.) was added slowly with stirring to a solution of 712 parts of 2,6-diisopropylphenol in 400 parts of the petroleum ether. External cooling was applied to maintain the reaction mixture at about 17° C. About ½ the sulfur dichloride solution was added over a 30 minute period during which time the evolution of HCl gas indicated that the reaction was proceeding. After ½ the sulfur dichloride had been added, the solution was refluxed at 38° C. for ½ hour. The remaining sulfur dichloride was then slowly added over a ½ hour period while the temperature was maintained between 18 and 24° C. The mixture was again refluxed for 30 minutes and then treated with activated charcoal, filtered and additional petroleum ether added. The product 4,4'-thiobis-(2,6-diisopropylphenol) is further reacted with an excess of sulfur to prepare 4,4'-trithiobis-(2,6-diisopropylphenol).

Example 39

360 parts of freshly redistilled ortho-tert-butyl guaiacol with a boiling point of 117-121° C. at 6.5 millimeters was diluted with low boiling petroleum ether in a stirred reaction vessel and 103 parts of sulfur dichloride also diluted with low boiling petroleum ether, was slowly added at 10-15° C. After addition of the sulfur dichloride was complete, the reaction mixture was warmed to 30° C. and left to stand at room temperature for about two days. The reaction mixture was then washed first with water, then with aqueous sodium bicarbonate and again with water, and then dried over calcium sulfate. After drying, the solvent was removed in vacuo at 95° C. and 0.1 millimeter pressure, leaving 230 parts residue of 4,4'-dithiobis-(2-methoxy-6-tert-butylphenol).

This compound, on analysis, was shown to contain 15.7 percent sulfur. The calculated content of 4,4'-dithiobis-(2-methoxy-6-tert-butylphenol) is about 15.2 percent sulfur.

In a similar manner other 4,4'-di- and trithiobis-(2-alkoxy-6-branched alkylphenol) compounds of this invention are prepared by reacting sulfur dichloride with 2-alkoxy-6-branched alkylphenol. Thus, 4,4'-dithiobis-(2-tert-butoxy-6-isopropylphenol) is prepared by reacting 2-tert-butoxy-6-isopropylphenol with sulfur dichloride.

Example 40

To a glass reaction vessel was charged 4,000 parts of carbon tetrachloride, 444 parts of carbon disulfide and 515 parts of 2,6-di-tert-butylphenol. The mixture was cooled to −15° C. and 129 parts of sulfur dichloride was slowly added thereto over a 1½ hours period. The mixture was then stirred at room temperature for 1½ hours and then heated to 50° C. for 15 minutes. The volatiles were then removed under reduced pressure producing a mixture of solid and oil which was dissolved in ether and washed with aqueous sodium carbonate, water and then dried over magnesium sulfate. 4,4'-dithiobis-(2,6-di-tert-butylphenol) is recovered from this reaction mixture.

Example 41

A solution of 34 parts of freshly distilled sulfur dichloride in about 25 parts of petroleum ether was slowly added with stirring to a solution of 123.6 parts of 2,6-di-tert-butylphenol in 60 parts of petroleum ether. One-half of the sulfur dichloride was added slowly at 20 to 25° C. and the mixture was heated to reflux, then cooled to 25° C. and the remaining sulfur dichloride was slowly added. Thereafter the mixture was kept at reflux for 99 hours. The solvent and volatiles were stripped under vacuum. Thereafter the resulting brownish-black oil was subjected to distillation and the residue was fractionally crystallized from methanol. After recovery of the fraction of crystals, the methanol solution was allowed to stand for an extended period of time during which 2 parts of material crystallized. Recrystallization of this material from 95 percent methanol gave yellow crystals of 4,4'-trithiobis-(2,6-di-tert-butylphenol) having a melting point of 129-130° C. The compound, on analysis, was shown to contain 19.0 percent sulfur. The calculated content for 4,4'-trithiobis-(2,6-di-tert-butylphenol) is 18.97 percent sulfur.

Example 42

2,6-di-tert-butylphenol (103 parts) is dissolved in 189 parts of ethylene dichloride. Sulfur monochloride (40.5 parts) in 63 parts of ethylene dichloride is added over a ½ hour period while the temperature is maintained at 35-38° C. with agitation. After the addition is complete the temperature is maintained at 35° for an additional hour. The reaction mixture is poured into stirred ice water. The water phase is separated and discarded. The water insolubles are washed once with water, once with 5 percent sodium bicarbonate and twice more with water. The organic phase is then dried and the solvent is removed by distillation under vacuum. After the solvent is removed the distillation is continued and at 0.2 millimeter pressure at 90°, a solid separates which is a chlorinated product. After this solid is removed the remaining residue is dissolved in a mixture of methanol and water and fractionally crystallized. A yellow crystalline precipitate is separated from the solution and washed with cold dilute methanol and dried. A total of 11.8 parts of 4,4′-trithiobis-(2,6-di-tert-butylphenol) is obtained by the reaction. 4,4′-dithiobis-(2,6-di-tert-butylphenol) is also obtained.

*Example 43*

In a reaction vessel equipped with heating means, cooling means, means for agitation and means for charging and discharging liquid and solid reactants was placed 412 parts of 2,6-di-tert-butylphenol dissolved in 1200 parts of nitrobenzene. The solution was agitated at 15–20° C. and 103 parts of sulfur dichloride in 300 parts of nitrobenzene were slowly added over a 40 minute period. After addition of the sulfur dichloride was complete, agitation was continued until evolution of hydrogen chloride ceased. The reaction temperature was then raised to 35° for 30 minutes and then to 45° for an additional 10 minutes at which point no more hydrogen chloride evolved at 45°. The mixture was then chilled in an ice bath and volatiles were subsequently removed. The final distillation conditions were 0.1–0.01 milliliter of mercury at steam bath temperature. After the removal of volatiles the residue contained a yellow solid from which both 4,4′-dithiobis-(2,6 - di-tert-butylphenol) and 4,4′ - trithiobis-(2,6-di-tert-butylphenol) were isolated.

I claim:

1. Organic material normally tending to deteriorate in the presence of air, oxygen or ozone protected against such deterioration by the inclusion therein of a small antioxidant quantity of a compound having the formula:

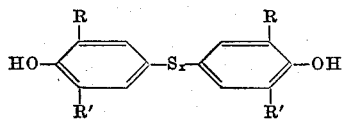

wherein R is an alkyl group branched on the alpha carbon atom having from 3 to 4 carbon atoms, inclusive, R′ is an alkyl group branched on the alpha carbon atom having from 3 to 4 carbon atoms inclusive, and $x$ is an integer from 2 to 3.

2. The composition of claim 1 wherein said organic material is a saturated hydrocarbon synthetic polymer derived from polymerization of an aliphatic mono-olefin hydrocarbon compound having up to 4 carbon atoms.

3. The composition of claim 2 wherein said saturated hydrocarbon synthetic polymer is polyethylene.

4. The composition of claim 1 wherein said organic material is rubber.

5. The composition of claim 4 wherein said rubber is sulfur vulcanized rubber.

6. The composition of claim 1 wherein said organic material is a lubricating oil selected from the group consisting of hydrocarbon lubricating oil and synthetic non-hydrocarbon lubricating oil.

References Cited by the Examiner

UNITED STATES PATENTS

| | | | |
|---|---|---|---|
| 2,174,248 | 9/1939 | Mikeska et al. | 252—404 |
| 2,209,463 | 7/1940 | Lieber et al. | 252—404 |
| 2,581,919 | 1/1952 | Albert | 260—609 |
| 3,060,121 | 10/1962 | Orloff et al. | 252—48.2 |
| 3,067,259 | 12/1962 | Bailey | 252—52 |
| 3,069,384 | 12/1962 | Coffield | 252—48.2 |
| 3,114,713 | 12/1963 | Coffield | 252—48.2 |

FOREIGN PATENTS

| | | |
|---|---|---|
| 201,160 | 1/1956 | Australia. |
| 712,317 | 7/1954 | Great Britain. |

DANIEL E. WYMAN, *Primary Examiner.*

ALPHONSO D. SULLIVAN, *Examiner.*

E. W. GOLDSTEIN, P. P. GARVIN,
*Assistant Examiners.*